US 6,435,837 B1

(12) United States Patent
Lopez et al.

(10) Patent No.: US 6,435,837 B1
(45) Date of Patent: Aug. 20, 2002

(54) PUMP ARRANGEMENT FOR LIQUID TANKS

(75) Inventors: Miguel Mota Lopez; Juan Jesus Elvira Peralta, both of Rubi (ES)

(73) Assignee: Fico Transpar, S.A., Rubi (ES)

( * ) Notice: Subject to any disclaimer, the term of this patent is extended or adjusted under 35 U.S.C. 154(b) by 0 days.

(21) Appl. No.: 09/555,564

(22) PCT Filed: Nov. 19, 1998

(86) PCT No.: PCT/EP98/07425

§ 371 (c)(1),
(2), (4) Date: Jun. 1, 2000

(87) PCT Pub. No.: WO99/28632

PCT Pub. Date: Jun. 10, 1999

(30) Foreign Application Priority Data

Dec. 2, 1997 (DE) .......................... 197 53 457

(51) Int. Cl.[7] ................................. F04B 49/04
(52) U.S. Cl. ........................... 417/36; 417/40
(58) Field of Search ..................... 417/40, 36

(56) References Cited

U.S. PATENT DOCUMENTS

| 3,593,267 A | * | 7/1971 | Hans et al. .................. 340/52 |
| 3,941,073 A | * | 3/1976 | Ridgeway ............... 114/183 R |
| 4,934,914 A | * | 6/1990 | Kobayashi et al. ...... 417/423.3 |
| 5,257,911 A | * | 11/1993 | Mota et al. .................. 417/63 |

FOREIGN PATENT DOCUMENTS

| DE | 37 30 006 | | 3/1989 |
| DE | 91 03 554 | | 5/1991 |
| EP | 9103554-6 | * | 5/1991 |
| EP | 0 511 352 | | 11/1992 |
| EP | 0 712 061 | | 5/1996 |
| ES | P9000819 | | 3/1990 |

* cited by examiner

Primary Examiner—Charles G. Freay
Assistant Examiner—William H Rodriguez
(74) Attorney, Agent, or Firm—Renner, Otto, Boisselle & Sklar, LLP

(57) ABSTRACT

A pump arrangement for windshield washer systems of motor vehicles includes a pump housing (30) and an impeller (32) within the pump housing (30) for pumping a liquid. The pump housing (30) includes a liquid inlet (36), and a liquid outlet (38) through which the impeller (32) delivers the liquid (5) out of the pump housing (30). The pump arrangement also includes a sensor housing (40) that is connected to the pump housing (30). The sensor housing (40) includes a sensor arrangement (42, 42') for responding to a changing liquid level (H,L) in the sensor housing (40). The sensor housing (40) has a liquid inlet (44) and a liquid outlet (46). The liquid outlet (46) of the sensor housing (40) and the liquid inlet (36) of the pump housing (30) are co-axially arranged with respect to each other.

17 Claims, 5 Drawing Sheets

PUMP ARRANGEMENT FOR LIQUID TANKS

1. TECHNICAL FIELD

The present invention relates to a pump arrangement for a liquid tank, as used in particular for windscreen washer systems of motor vehicles, boats, trains and ships. In particular, the present invention relates to a pump arrangement having an integrated liquid-level detector with which a critical liquid level in the liquid tank can be detected.

2. BACKGROUND

Windscreen washer systems in particular for motor vehicles, which have pump arrangements as an integral part, are known in the prior art. Windscreen washer systems usually consist of a liquid tank (normally made of plastic), a pump arrangement, a nozzle and connecting lines which connect the tank, the pump arrangement and nozzle to one another. If an operator actuates the windscreen washer system, the pump arrangement draws or pumps liquid out of the liquid tank and forces this liquid through the connecting lines towards the nozzle, from which the liquid issues and wets the windscreen.

For some time, such windscreen washer system have also been provided with a liquid-level detector which monitors the liquid level in the liquid tank. If the liquid level in the liquid tank falls below a predetermined minimum level, the liquid-level detector initiates a warning signal. The operator will realize from this warning signal (which may be optical or acoustic) that the liquid level in the liquid tank has fallen below a critical measure and is to be brought up to the full level again, if possible immediately.

Essentially two proposals as to how the liquid-level detector is preferably to be attached to the liquid tank have been made hitherto in the prior art.

According to the first approach to achieving a solution (for example described in Spanish Patent Application P 90 00 819), the liquid-level detector is attached to the liquid tank independently of the pump arrangement. The sensors (electrodes) project into the liquid tank and detect the level there. If the level falls below a predetermined measure, this leads to a voltage drop at the electrodes, as a result of which the warning signal is initiated.

However, this previously known technique has the disadvantage that it may lead to unsteady or intermittent sensor signals as a result of wave motions in the liquid tank. These wave motions may lead to the warning signal being initiated briefly, even though the level in the liquid tank has still not fallen to the critical measure. In order to take this effect into account, the use of electronic logic circuits have been considered, which release the warning signal only when a certain sequence of sensor-signal events has occurred. This leads to increased costs for the entire arrangement. The fact that two electric lines for the pump arrangement and the liquid-level detector, which are provided separately, have to be provided leads to an additional increase in costs.

According to a further previously known approach to achieving a solution, as described, for example, in EP 0 511 352 A1, the liquid-level detector is designed to be an integral part of the pump arrangement. This previously known pump arrangement contains, on the one hand, a pump housing and, on the other hand, an integrated sensor housing in which the liquid-level detector is accommodated. The sensor housing has an inlet and an outlet, which are arranged in such a way that liquid can enter the sensor housing, and the level in the sensor housing corresponds to the level in the liquid tank. The outlet of the sensor housing merges into the inlet of the pump housing, via which inlet the pump arrangement draws the liquid out of the liquid tank. With such an arrangement, it is possible to counter the disadvantages described above, since the liquid-level detector no longer measures the liquid level in the (main) liquid tank but in the very much smaller sensor housing, in which the wave motion of the liquid only has a considerably damped effect.

However, such an arrangement has the disadvantage that it is always expensive to produce. Due to the fact that the sensor housing exchanges liquid directly with the inlet of the pump housing (i.e. merges into this inlet), it is necessary to provide a valve mechanism between the sensor housing and the pump housing, otherwise liquid will be forced into the sensor housing when the pump turbine located in the liquid inlet of the pump housing is actuated. This leads to an undesirable second liquid path, which impairs the mode of action of the pump arrangement.

Another pump arrangement is known from the prior art document DE 37 30 006. The described arrangement comprises a pump housing and a sensor housing attached thereto. According to this prior art approach, the inlet of the pump housing and outlet of the sensor housing are arranged parallel to each other in a common connection piece. This arrangement serves the purpose to allow an assembling of the pump arrangement close to the liquid tank. The disadvantage of this arrangement is, however, that the cross section of the sensor housing outlet in the common connection piece is very small and may be detrimentally effected by impurities in the windshield water. Simply increasing the diameter thereof, on the other hand, would either increase the circular diameter of the connecting piece, or lead to a non-circular connecting piece. Both alternatives are, however, undesired because an increased circular diameter leads to a considerable increase of the wall thickness of the connecting piece, with a related waste of material. A non-circular connecting piece, on the other hand, is difficult to seal with respect to the liquid tank.

Consequently, the technical problem of the present invention is to provide a pump arrangement which, on the one hand, is of simple construction and is therefore inexpensive to produce and, on the other hand, permits precise measurement of the level in the liquid tank.

3. SUMMARY OF THE INVENTION

The solution to the above problem is achieved according to the present invention in its widest approach by a pump arrangement which has a pump housing and an integrated, separate sensor housing.

To put it more precisely, the solution results from a pump arrangement according to patent Claim 1, namely a pump arrangement, in particular for windscreen washer systems of motor vehicles, which comprises:

a. a pump housing in which a liquid-delivery device and a drive device functionally connected to it are provided, the pump housing having
   a1. a liquid inlet through which the said liquid-delivery device delivers the liquid, to be delivered, into the pump housing; and
   a2. a liquid outlet through which the said liquid-delivery device delivers the liquid, to be delivered, out of the pump housing;
b. a sensor housing which is connected to the pump housing and in which a sensor arrangement is provided which responds to a changing liquid level in the sensor housing, the sensor housing having b1. a liquid inlet through which liquid can enter the sensor housing; and b2. a liquid outlet through which the said liquid can issue from the sensor housing; characterized in that c. the liquid outlet (46) of the sensor housing (40) and the liquid inlet (36) of the pump housing (30) are co-axially arranged with respect to each other, so that the throughflow path of the liquid through the liquid outlet of the sensor housing and the throughflow path of the liquid through the liquid inlet of the pump housing are spatially separated from one another.

Accordingly, the pump arrangement according to the invention solves the problem of the invention in particular owing to the fact that the liquid outlet of the sensor housing and the liquid inlet of the pump housing are co-axially arranged, to run spatially separated from one another.

Such an arrangement has the advantage that a valve arrangement between the sensor housing and the pump housing is no longer necessary; the liquid path of the sensor device is separate from the liquid path of the pump device. Further, due to the co-axial arrangement, the liquid delivery device (usually a suction spindle) is provided in a separate sub-housing allowing a very easy replacement of a spare liquid delivery device in the protective sub-housing, which does not require a difficult alignment of the spindle within the connection piece.

In the pump arrangements according to Claims 2 and 3, in each case either the liquid inlet of the pump housing may be arranged inside the liquid outlet of the sensor housing or the liquid outlet of the sensor housing may be arranged inside the liquid inlet of the pump housing. The geometry selected depends on the given conditions and in particular on the shaping of the liquid tank. At the same time, simple installation of the pump arrangement according to the invention is possible, since this pump arrangement only has to be connected to the liquid tank by means of two connection pieces (the liquid inlet of the sensor housing and the combined liquid inlet of the pump housing/liquid outlet of the sensor housing). In this connection, it may be pointed out that the throughflow paths of the sensor-housing outlet and the pump-housing inlet need not necessarily have a common axis of symmetry. It is also conceivable for the outlet of the sensor housing and the inlet of the pump housing to have a differently shaped cross-section (for example round and elliptical). It is important that separation of the throughflow paths inside the pump arrangement is achieved.

The pump arrangement according to Patent Claim 4 has the special advantage that, due to the different axial length of the (concentric) liquid inlets and outlets, further separation of the throughflow paths is achieved, since the liquid inlet of the pump housing acts on liquid layers of a horizontal plane which is different from that of the outlet of the detector housing.

The pump arrangement according to Patent Claims 5 and 6 has the special advantage that the pump efficiency can surprisingly be increased to a considerable extent. An optimized delivery output becomes possible due to the clearance of the axial suction spindle inside the liquid inlet of the pump housing. The inventors of the present invention have carried out tests and have discovered that the pump does not work perfectly when the suction spindle lies exactly on the axial longitudinal axis of the liquid inlet.

The pump arrangements according to Claims 7 and 8 describe the two embodiments of the present invention which are preferred at present. In the pump arrangement according to Claim 7, the sensor arrangement consist of two electrodes which run essentially parallel to one another and to which a voltage is applied. The voltage drop between the two electrodes depends on whether there is liquid between the electrodes. If the level in the sensor housing falls in such a way that there is no longer any liquid between the sensors, this leads to an increase in the voltage drop, which increase initiates the warning signal. If the liquid level is such that there is liquid between the electrodes, the voltage drop is slight; no warning signal is emitted. Such a pump arrangement has the advantage that it is especially simple and therefore inexpensive to realize, and works reliably.

In the pump arrangement according to Claim 8, the sensor arrangement consists of a float movable in the sensor housing. The float is provided with a first contact element and interacts with a second contact element, in a fixed position relative to the sensor chamber, if the level in the sensor chamber falls to the critical measure.

4. BRIEF DESCRIPTION OF THE DRAWINGS

Further details and advantages of the present invention are obtained from the following detailed description of the preferred embodiments, which are explained with reference to the drawing, in which.

5. DESCRIPTION OF THE PREFERRED EMBODIMENTS

Figure 1:
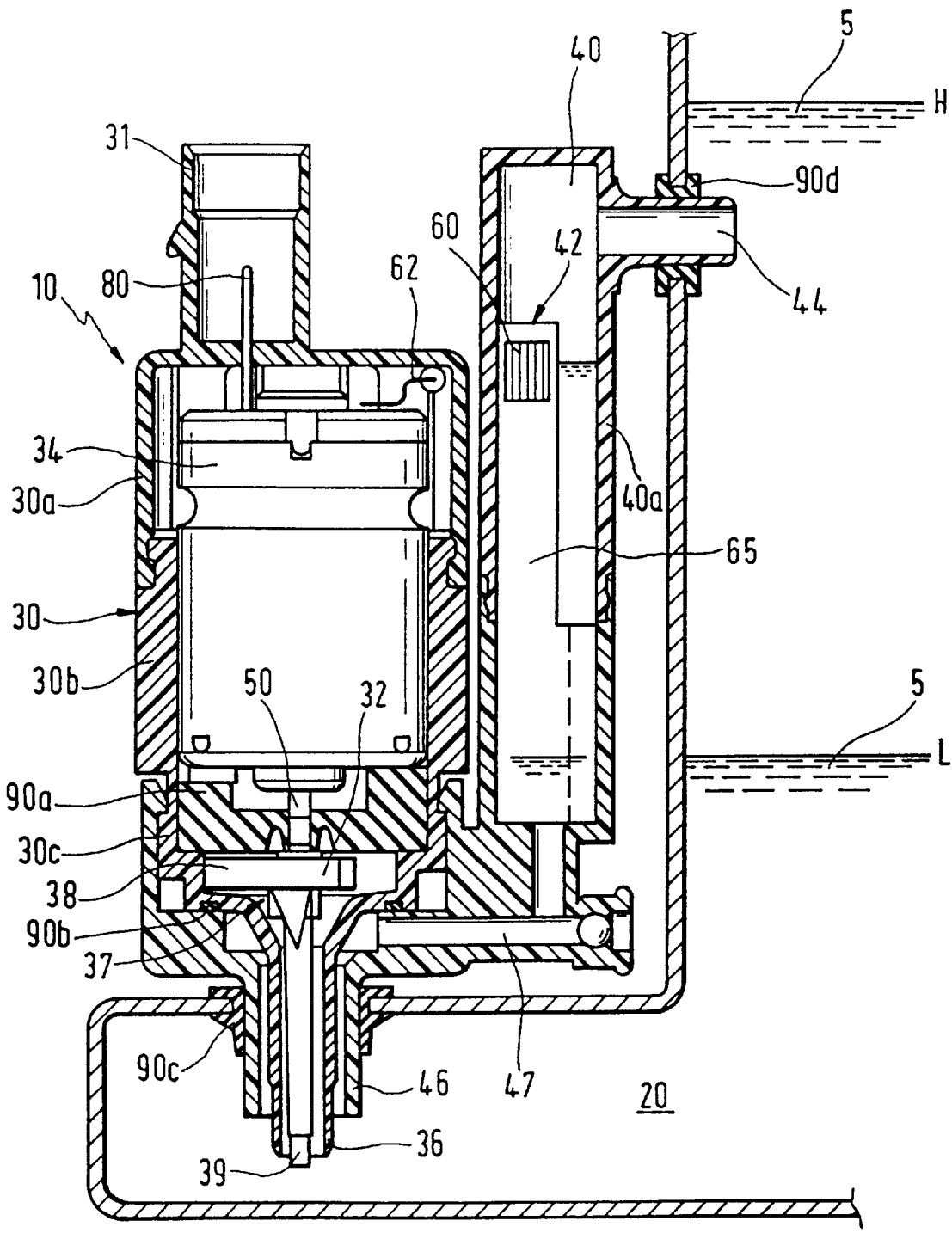
FIG. 1 shows a first preferred embodiment of the present invention in longitudinal section along section line A—A in FIG. 2.
Figure 2:
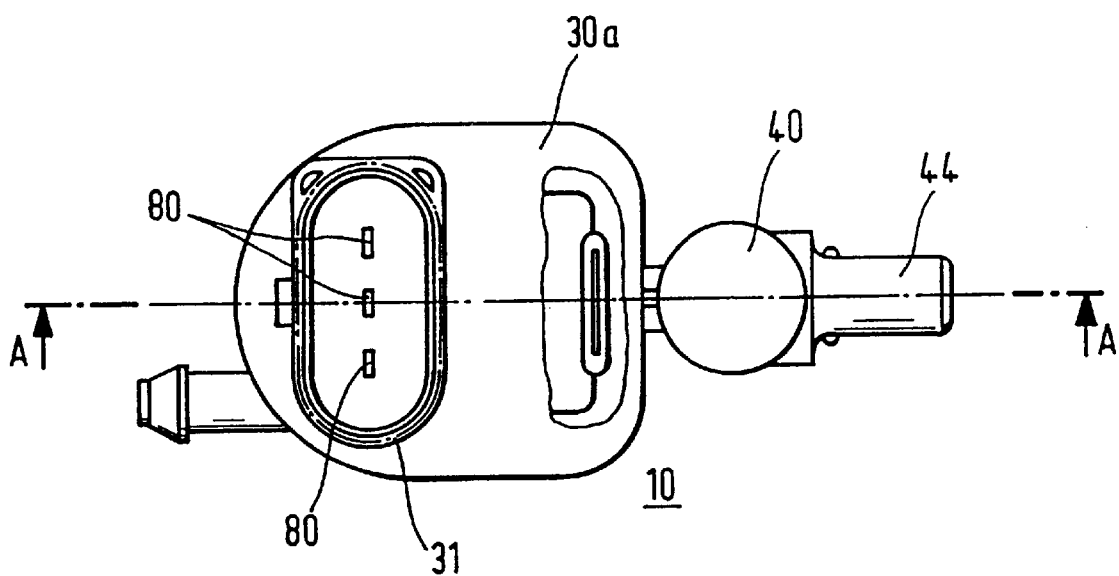
FIG. 2 shows a plan view of a pump arrangement in the first preferred embodiment of the present invention.

The first preferred embodiment of the pump arrangement 10 according to the invention is shown in longitudinal section in FIG. 1. The sectional view corresponds to section line A—A in FIG. 2, which shows a plan view of the pump arrangement 10 according to the invention in the first embodiment.

In FIG. 1, the pump arrangement 10 according to the invention is shown in the mounted state on a liquid tank 20. If the pump arrangement 10 according to the invention is used in a motor vehicle, the liquid tank 20 with the pump arrangement 10 is normally located in the engine compartment of the motor vehicle. Since the space requirement, on the one hand, and the costs, on the other hand, are of crucial importance in motor-vehicle construction, these aspects, in addition to the technical reliability, represent the main considerations for the present invention.

The liquid tank 20 (not fully shown) holds the liquid 5, which is delivered to the spray nozzles (not shown) by means of the pump arrangement. The liquid 5 is normally water, to which, if need be, additional chemical cleaning or anti-freeze agents may be added.

The liquid level of the liquid 5 in the tank 20 changes continuously as a function of the liquid quantity which is pumped out of the tank 20 by means of the pump arrangement 10. Shown in FIG. 1 merely as typical levels are two liquid levels (H, L), which represent two particular liquid levels. The liquid level H indicates a liquid level at which there is still sufficient liquid in the liquid tank 20. In contrast, the liquid level L indicates a liquid level at which according to the invention a warning signal is to be initiated. The critical liquid level L is established by the arrangement or dimensioning or design of the sensor arrangement (cf. below).

According to the invention, the pump arrangement 10 consists of a pump housing 30 and a sensor housing 40, which are integrated in the assembled state. Preferred materials for the pump housing and the sensor housing are all common plastics which can be formed, for example, by the injection moulding process.

The pump housing 30 consists of a top part 30a, a centre part 30b and a base part 30c which are produced individually and can be interlocked with one another. The top part 30a is provided with a connecting plug 31, to which a connecting socket (not shown) of complementary design can be applied. Located in the connecting plug 31 are connecting contacts 80 for the drive device 34 according to the invention, which is an electric motor in the preferred embodiment, as well as for the sensor arrangement 42 according to the invention. Three connecting contacts are preferably provided, with in each case a phase for the preferred electric motor and the sensor arrangement, and a common earth.

The centre part 30b is interlocked with the top part 30a in the assembled state. The centre part 30b preferably accommodates the electric motor 34 in a positive-locking connection and merges at its bottom section into the liquid inlet 36 of the pump housing. Furthermore, in addition to the motor 34 and a sealing sleeve 90a, the liquid-delivery device 32 is also accommodated in the centre part 30b. In the preferred embodiment of the present invention, the liquid-delivery device 32 consists of a suction turbine 37, which consists of a turbine propeller part 38 and an axial suction spindle 39 which extends axially through the liquid inlet 36 of the pump housing 30.

The centre part 30b is in turn interlocked with the base part 30c and is sealed off from the latter by an O-ring seal 90b. The base part 30c merges at its bottom section into the liquid outlet 46 of the sensor chamber, which is still to be described. The liquid outlet 46 is sealed off from the liquid tank 20 by a seal 90c. As can be seen from FIG. 1, the liquid inlet 36 of the pump housing 30 and the liquid outlet 46 of the sensor housing 40 have different axial or longitudinal dimensions.

The liquid outlet 46 of the sensor chamber 40 merges into an at first horizontally and then vertically running liquid passage 47, which opens out in the actual sensor chamber 40, which is preferably of cylindrical design. The latter is provided at its top end with an inlet 44, through which the tank 20 exchanges liquid with the sensor chamber 40. The sensor housing 40 is in turn defined by a housing part 40a which is interlocked with the base part 30c of the pump housing 30.

In the first preferred embodiment, a float 42 is located inside the sensor housing 40, which float 42 can assume different axial positions as a function of the liquid level in the sensor housing 40. If there is a high liquid level H in the liquid tank 20, the float 42 comes to rest on the top boundary wall of the housing part 40a of the sensor housing 40. If the level falls to the critical, low level L, the float follows this movement until it comes to rest on the bottom end of the sensor chamber 40. In this position (shown in FIG. 1), a contact element 60 (accommodated in the top end of the float 42) now comes into interaction with a contact element 62 of complementary design (formed in a fixed position in relation to the float 42) in order to produce the warning signal. In the preferred embodiment according to FIG. 1, the first and second contact elements 60, 62 consist of complementary elements of a magnetic switch, the first contact element (integrated in the float 42) preferably being a permanent magnet. The second contact element 62 is preferably located in the pump housing 30 in a position close to that wall part of the top part 30a of the pump housing 30 which is adjacent to the sensor housing 40. The vertical position of the second contact element 62 is selected in such a way that it comes into interaction with the first contact element 60 if the float 42 has assumed the vertical position in the sensor housing 40 corresponding to the critical level L. As already explained above, the second contact element 62 is electrically connected to the corresponding contact connections 80 in order to direct the warning signal to an electronic analysing means (not shown).

The first embodiment 10 according to the invention works as follows:

If the initially empty liquid tank 20 is filled with liquid 5, the sensor housing 40 fills up via the liquid outlet 46 (in this case acting as an inlet), in the course of which it is vented via the liquid 44. This continues until the sensor housing 40 is completely filled and the liquid tank 20 has reached a desired level, shown by way of example in FIG. 1 by the liquid level H. Since the float 65 has a lower specific density than the liquid 5, it is subjected to a buoyancy force until it comes to rest on the top boundary wall of the housing part 40a of the sensor housing 40. If the operator now actuates the pump arrangement, the motor 34 is electrified and the suction turbine is put into operation. By the rotational movement of the suction turbine, liquid 5 is extracted from the liquid tank 20 via the liquid inlet 36 and is fed through the liquid outlet 46 to the spray nozzle (not shown).

If the level in the liquid tank 20 now falls to the critical liquid level L as a result of continual or repeated actuation of the pump arrangement, this leads to the float 42 likewise sinking and coming to rest on the underside of the sensor housing 40. In this position, the first contact element 60 in the float 65 comes into interaction with the second contact element 62 and produces the alarm signal, which is transmitted via the contacts 80 to a corresponding electronic analysing means (not shown). This electronic analyzing means produces a corresponding "low-level" warning signal, which may be either optical or acoustic.

Figure 3:
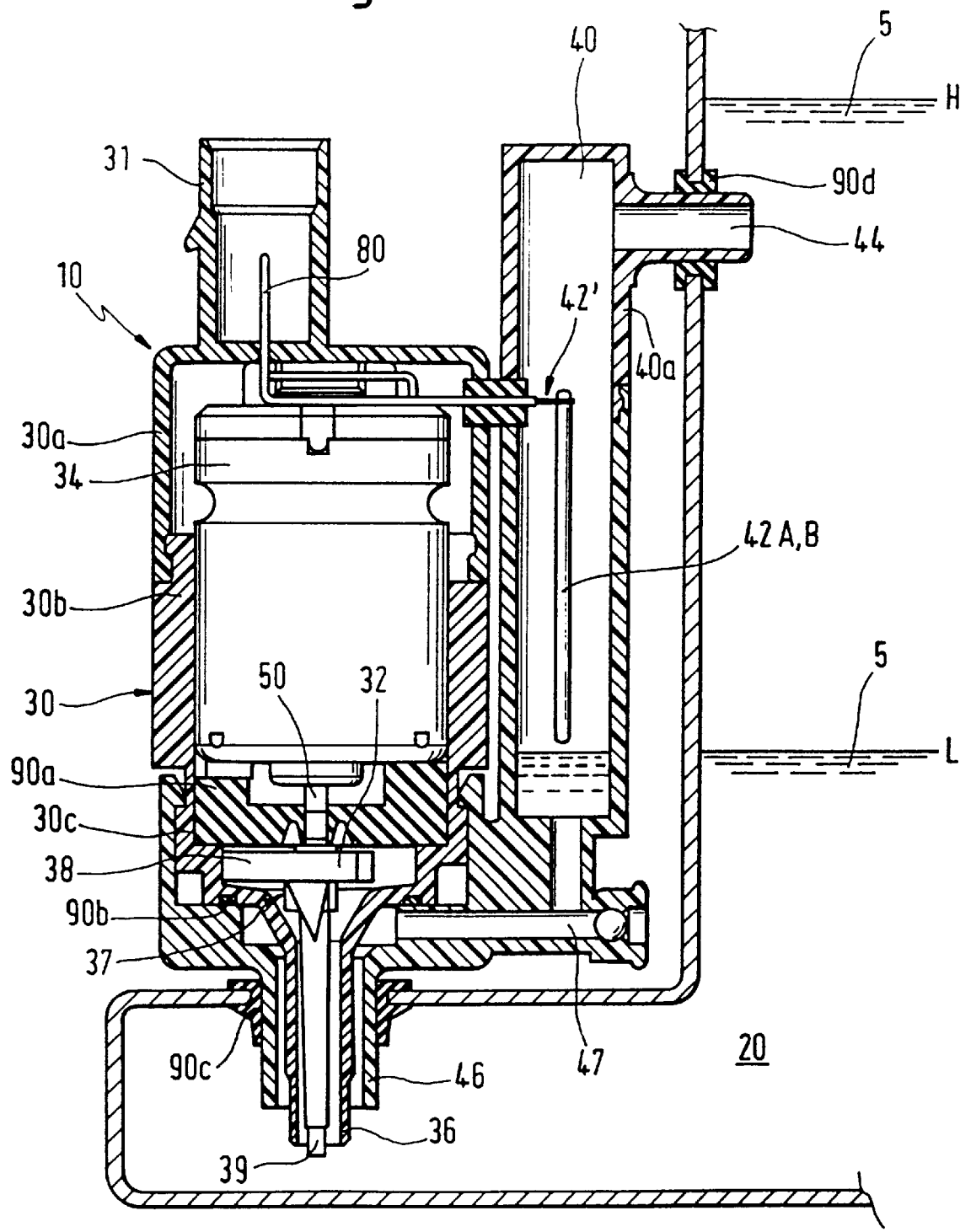
FIG. 3 shows a second preferred embodiment of the present invention in longitudinal section along section line A—A in FIG. 4.
Figure 4:
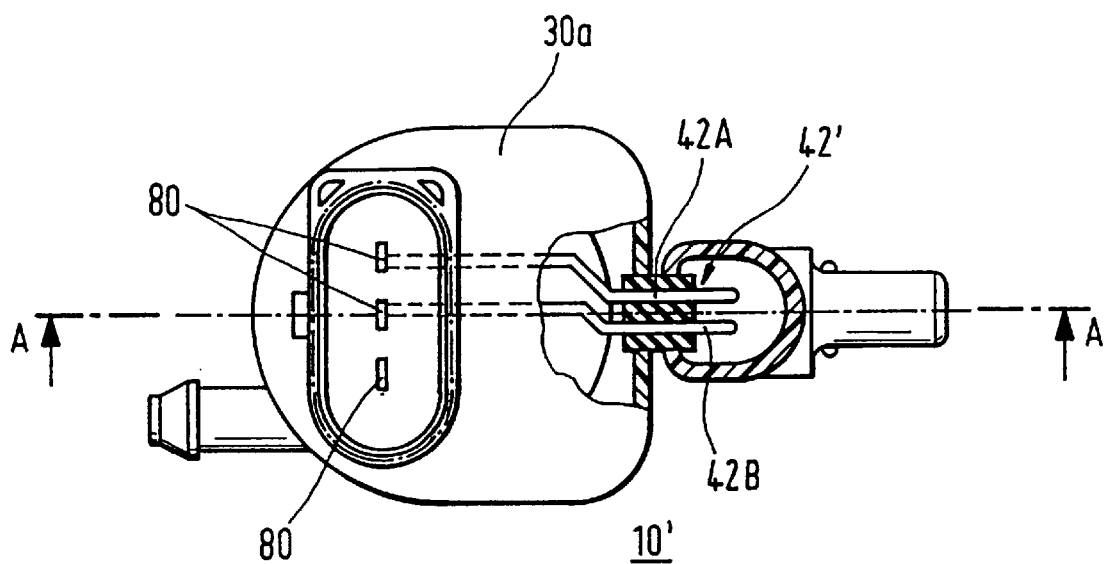
FIG. 4 shows a plan view of a pump arrangement in the second preferred embodiment of the present invention.

The second preferred embodiment of the pump arrangement 10 according to the invention is described below with reference to FIGS. 3 and 4. It is pointed out that, in the second preferred embodiment of the present invention, those elements which are identical to corresponding elements of the first embodiment have the same reference numerals and therefore they are not described. Instead, reference is made in full to the corresponding statements with regard to the first embodiment.

The second embodiment differs from the first embodiment by the sensor arrangement 42'. Instead of a float, the second embodiment uses two electrodes 42A, 42B which, in the preferred embodiment, are in the form of two parallel, elongated rods. A voltage is applied to the two rods via the two allocated electrodes 80, which voltage leads to a voltage drop between the electrodes. If the two electrodes 42A, 42B are located in a sensor tank 40 filled with liquid 5, a certain first voltage drop $V_1$ occurs as a result of the increased conductivity of the liquid 5. If the level in the liquid tank 20 falls to the critical level L, this leads to a situation in which there is no longer any liquid 5 between the electrodes 42A, 42B, as a result of which a voltage drop $V_2$ occurs. The transition from the voltage drop $V_1$ to the voltage drop $V_2$ is detected by an electronic analysing means (not shown) and the corresponding warning signal "low-liquid level" is produced.

Figure 5:
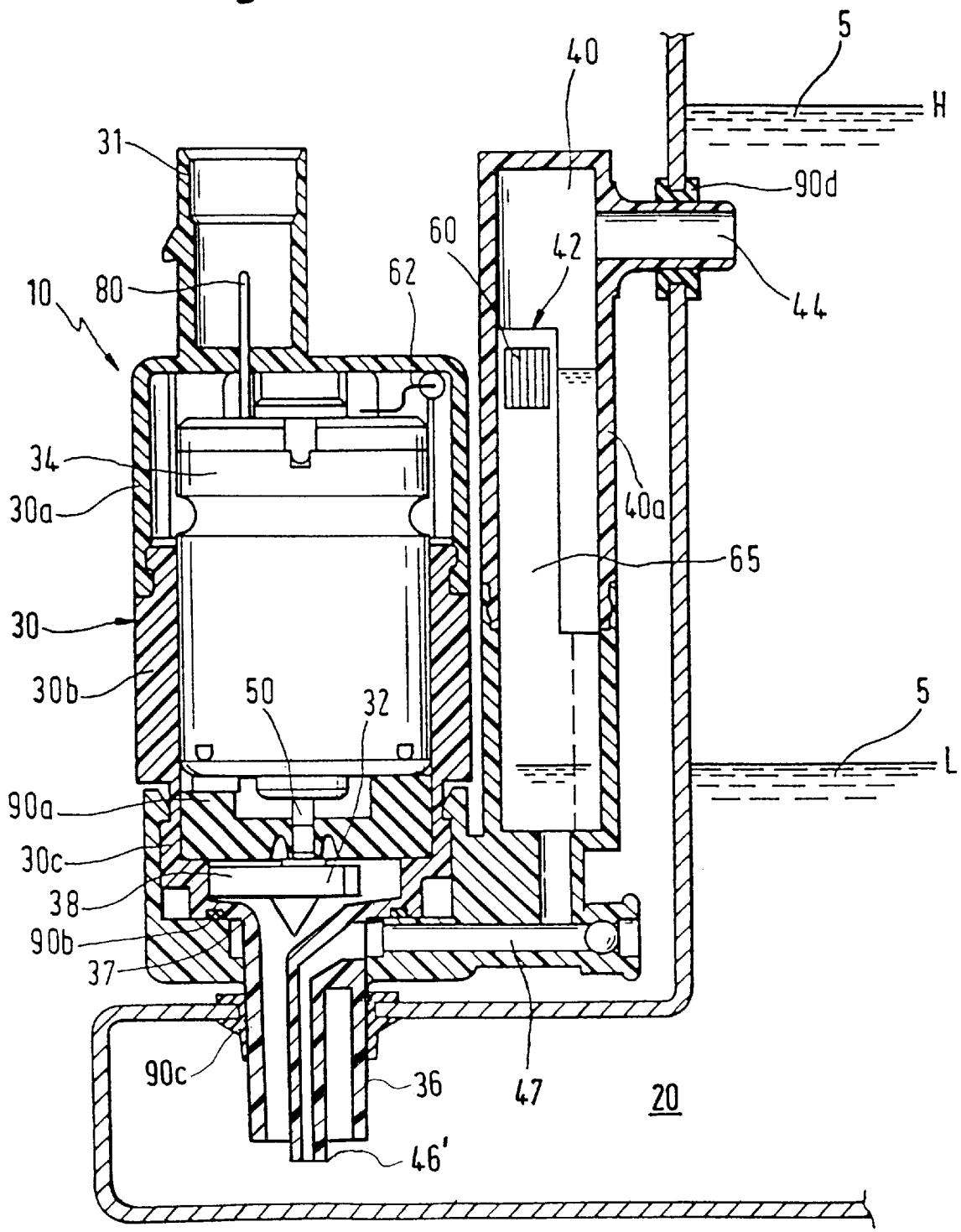

A third preferred embodiment of the pump arrangement 10 according to the invention is described below with reference to FIG. 5. It is again mentioned that those elements which are identical to corresponding elements in the first embodiment have the same reference numerals and are not described again and reference should be made to the above description with regard to the first embodiment.

The third embodiment differs from the first embodiment by the arrangement of the liquid outlet 46 of the sensor housing 40 inside the liquid inlet 36 of the pump housing 30. The geometry selected depends on the given conditions and in particular on the shaping of the liquid tank.

What is claimed is:

1. A pump arrangement, in particular for wind-screen washer systems of motor vehicles, comprising:
    a. a pump housing in which a liquid-delivery device and a drive device functionally connected thereto are provided, the pump housing having
        a1. a liquid inlet through which the said liquid-delivery device delivers liquid, to be delivered, into the pump housing; and
        a2. a liquid outlet through which the said liquid-delivery device delivers the liquid, to be delivered, out of the pump housing;
        a3. the pump housing includes at least a first part containing at least one of the drive device and the liquid-delivery device where the at least first part can be interlocked with a second part of the pump housing; and
    b. a sensor housing which is connected to the pump housing and in which a sensor arrangement is provided which responds to a changing liquid level (H,L) in the sensor housing, the sensor housing having
        b1. a liquid inlet through which liquid can enter the sensor housing; and
        b2. a liquid outlet through which the said liquid can issue from the sensor housing; wherein
    c. the liquid outlet of the sensor housing and the liquid inlet of the pump housing are co-axially arranged with respect to each other, so that the throughflow path of the liquid through the liquid outlet of the sensor housing and the throughflow path of the liquid through the liquid inlet of the pump housing are spatially separated from one another.

2. A pump arrangement according to claim 1, in which the liquid inlet of the pump housing is arranged inside the liquid of the sensor housing.

3. A pump arrangement according to claim 1, in which the liquid outlet of the sensor housing is arranged inside the liquid of the pump housing.

4. A pump arrangement according to claim 2, in which the liquid outlet of the sensor housing and the liquid inlet of the pump housing have a different axial lengths.

5. A pump arrangement according to claim 1, in which the liquid-delivery device comprises a suction turbine which consists of a turbine propeller part and an axial suction spindle, the axial suction spindle extending through the liquid inlet of the pump housing.

6. A pump arrangement according to claim 5, in which the drive device comprises an electric motor provided with a rotary shaft, the rotary shaft of the electric motor being coupled to the turbine propeller part of the suction turbine in such a way that the axial suction spindle is mounted with clearance in the liquid inlet of the pump housing or does not rotate exactly on the centre line of the liquid inlet of the pump housing.

7. A pump arrangement according to claim 1, in which the sensor arrangement consists of two electrodes, which are arranged in a position in the sensor housing so that the liquid in the sensor housing makes an electrical connection between them when the level is "high", and the electrical connection is interrupted when the level is "low".

8. A pump arrangement according to claim 1, in which the sensor arrangement consists of a float which is provided with a first contact element and changes its position as a function of the level of the liquid in the sensor chamber, in which case, when the level is "high", the first contact element comes into interaction with a second contact element fixed relative to the sensor chamber, and, when the level is "low", the interaction between the first and the second contact element is interrupted as a result of the change in position of the float.

9. A pump arrangement according to claim 8, in which the first and second contact elements are elements of a magnetic switch.

10. A pump arrangement according to claim 9, in which the first contact element is a permanent magnet and the second contact element is a magnetic switch, the second contact element being arranged in the pump housing adjacently to the sensor housing.

11. A pump comprising a liquid-level sensor having a sensor housing having a sensor arrangement capable of responding to changes in a liquid level in the sensor housing; a drive device; a liquid-delivery device connected to the drive device; and a pump housing connected to and separable from the sensor housing, the pump housing having at least two interlockable parts, at least one of the two parts containing at least one of the drive device and the liquid delivery device.

12. A pump as set forth in claim 11, wherein the pump housing has a liquid inlet through which the liquid-delivery device draws a liquid, and the sensor housing having a liquid outlet that is coaxial with the liquid inlet of the pump housing.

13. A pump as set forth in claim 12, wherein the liquid outlet of the sensor housing and the liquid inlet of the pump housing are spaced apart.

14. A pump as set forth in claim 11, wherein the drive device is an electric motor.

15. A pump as set forth in claim 11, wherein the liquid-delivery device includes a suction turbine.

16. A pump as set forth in claim 11, wherein the sensor arrangement includes a float having a permanent magnet.

17. A pump as set forth in claim 11, wherein the sensor arrangement includes a pair of spaced apart electrodes.

* * * * *